United States Patent
Mamata

[11] Patent Number: 6,067,589
[45] Date of Patent: May 23, 2000

[54] USB LEGACY SUPPORT SYSTEM

[75] Inventor: Tohru Mamata, Tokyo, Japan

[73] Assignee: Kabushiki Kaisha Toshiba, Kawasaki, Japan

[21] Appl. No.: 09/061,030

[22] Filed: Apr. 16, 1998

[30] Foreign Application Priority Data

Apr. 17, 1997 [JP] Japan ................................... 9-100229

[51] Int. Cl.[7] .............................................. G06F 15/02
[52] U.S. Cl. .............................. 710/63; 710/62; 710/129; 710/73; 710/15
[58] Field of Search ................................. 710/62, 15, 5, 710/18, 73, 129, 269, 63

[56] References Cited

U.S. PATENT DOCUMENTS

| | | | |
|---|---|---|---|
| 5,590,312 | 12/1996 | Marisetty | 395/500.44 |
| 5,610,601 | 3/1997 | Lahti et al. | 341/22 |
| 5,613,135 | 3/1997 | Sakai et al. | |
| 5,628,029 | 5/1997 | Evoy | 710/18 |
| 5,748,888 | 5/1998 | Angelo et al. | 713/200 |
| 5,835,791 | 11/1998 | Goff et al. | 710/62 |

OTHER PUBLICATIONS

"OpenHCI Legacy Support Interface Specification", Compaq Microsoft National Semiconductor, Release Version 1.01, pp. i–v and 1–11, (1996).

OpenHCI—Open host Controller Interface Specification for USB, Compaq National Semiconductor, pp. 132–146.

*Primary Examiner*—Paul R. Myers
*Attorney, Agent, or Firm*—Finnegan, Henderson, Farabow, Garrett & Dunner, L.L.P.

[57] ABSTRACT

Data input from a USB keyboard or mouse to a USB host controller is transformed by an SM-BIOS into data corresponding to a PS/2 keyboard/mouse, and then transferred to the I/O port (60h/64h) of a standard bus interface via the shadow port of a KBC. The KBC generates IRQ1 (IRQ12) similar to the case wherein it receives data from the PS/2 keyboard or mouse, thereby starting a keyboard driver.

20 Claims, 11 Drawing Sheets

USB LEGACY SUPPORT SYSTEM

BACKGROUND OF THE INVENTION

The present invention relates to a computer system and a USB device control method and, more particularly, to a computer system improved to be able to use a USB device even in an environment having no dedicated driver program for controlling the USB device, and a USB device control method.

Recently, in personal computers, USB (Universal Serial Bus) support has started for a higher degree of freedom of expandability of peripheral devices. USB is a serial interface standard which can be commonly used for communication with various USB devices such as a keyboard, a mouse, and a camera. With the use of this USB, a connector prepared for each peripheral device can be integrated in a USB connector, and a low-cost personal computer and a high degree of freedom of expandability can be implemented.

At present, however, a dedicated driver and a specific OS must be combined to enable use of the USB device. In an environment other than such an OS environment, the USB device cannot be used even in a personal computer having a USB connector.

The USB legacy support specifications for supporting the use of the USB device in an OS environment having no USB device support include an "OpenHCI-Legacy Support Interface Specification". This specification provides hardware and software mechanisms for enabling use of a USB keyboard or mouse as a normal PS/2 keyboard or mouse. A USB legacy support method defined in the "OpenHCI-Legacy Support Interface Specification" will be explained below.

Implementation of the USB legacy support function of the Open-HCI (OHCI) requires the following units.

Standard Keyboard Controller (KBC)

This keyboard controller controls the PS/2 keyboard or mouse, and has an I/O port (60h, 64h) used for communication between a keyboard (mouse) control program (keyboard control driver, keyboard BIOS, or the like) and the PS/2 keyboard or mouse.

OHCI Compliant USB Host Controller (HC)

The USB host controller controls the USB keyboard or mouse, and has an I/O port register ("Emulate" register) equivalent to a standard keyboard controller (KBC). The "Emulate" register is arranged to realize the USB legacy support, and assigned with the same I/O address (60h, 64h) as that of the above-described I/O port used as an input/output buffer in the standard keyboard controller. When a hardware interrupt signal IRQ1 (IRQ12) is generated from the KBC, the USB host controller traps the signal to generate an SMI (System Management Interrupt) for the purpose of the USB legacy support. The USB host controller also generates an SMI upon reception of packet data from the USB keyboard or mouse.

Hardware for Synchronously
 Enable/Disable-Controlling "Emulate" Register of HC and I/O Port of KBC This can be used to exclusively access the "Emulate" register of the HC and the I/O port of the KBC.

USB Legacy Support SM-BIOS

This SM-BIOS is started by an SMI from the HC.

The operation procedure of the USB legacy support function will be explained below.

1. Reception of Data from PS/2 Keyboard/Mouse
   (1) Upon reception of data from the PS/2 keyboard (mouse), the KBC sets the data in the output buffer of the I/O port, and generates IRQ1 (IRQ12).
   (2) IRQ1 (IRQ12) from the KBC is trapped by the HC. The HC generates an SMI to start the USB legacy support SM-BIOS.
   (3) After enabling the I/O port of the KBC (disabling the "Emulate" register of the HC), the SM-BIOS reads the keyboard (mouse) data from the output buffer of the KBC. Then, the SM-BIOS disables the I/O port of the KBC (enables the "Emulate" register of the HC), and writes the keyboard (mouse) data in the "Emulate" register of the HC. The SM-BIOS sets an IRQ1 (IRQ12) generation bit in the control register of the HC to cause the HC to generate IRQ1 (IRQ12).
   (4) Upon generation of IRQ1 (IRQ12), the keyboard (mouse) control program of a BIOS/OS/application starts. At this time, since the I/O port of the KBC is disabled, the keyboard (mouse) data is read from the "Emulate" register of the HC by a read access to the I/O address (60h, 64h) which is executed by the keyboard (mouse) control program.

2. Reception of Data from USB Keyboard/Mouse
   (1) Upon reception of a packet transfer request from the USB keyboard (mouse), the HC issues an SMI to start the SM-BIOS.
   (2) The SM-BIOS interprets the packet of the USB keyboard (mouse), produces data corresponding to the PS/2 keyboard (mouse), and writes the keyboard (mouse) data in the "Emulate" register of the HC. The SM-BIOS sets an IRQ1 (IRQ12) generation bit to cause the HC to generate IRQ1 (IRQ12).
   (3) Upon generation of IRQ1 (IRQ12), the keyboard (mouse) control program of the BIOS/OS/application starts to read the keyboard (mouse) data from the "Emulate" register.

3. Transmission of Command (KBC Command, PS/2 Keyboard/Mouse Command) to KBC
   (1) The keyboard (mouse) control program of the BIOS/OS/application issues a KBC command or a PS/2 keyboard/mouse command. This command is written in the "Emulate" register of the HC.
   (2) The HC generates an SMI to start the SM-BIOS.
   (3) The SM-BIOS reads the command from the "Emulate" register.
   (4) The SM-BIOS enables the I/O port of the KBC, and writes the command in the input buffer. The SM-BIOS disables the I/O port of the KBC again.
   (5) If needed, the SM-BIOS generates a command corresponding to the USB keyboard (mouse), and transfers it to the USB keyboard (mouse) via the HC.

In the USB legacy support function of the OHCI, all communication with the keyboard (mouse) control program of the BIOS/OS/application is performed using the "Emulate" register of the HC when the legacy support function is valid. For this reason, when data is received from either one of the USB keyboard/mouse and the PS/2 keyboard/mouse, the SM-BIOS is started for proper data setting in the "Emulate" register.

As described above, in the USB legacy support function of the OHCI, not only when data is received from the USB keyboard/mouse, but also when data is received from the PS/2 keyboard/mouse, communication with a normal (mouse) keyboard control program must be performed via the USB legacy support BIOS. The configuration in which all processes including normal handshake with the KBC that is directly independent of the USB are performed via the BIOS leads to a decrease in processing speed of the system. Since a time lag exists between input of data from the PS/2 keyboard/mouse and actual transfer of the data to the keyboard (mouse) control program, all the input data may not be received.

Since the HC must trap the interrupt signal IRQ1 (IRQ12) from the KBC, the HC must be laid out between the KBC and the interrupt controller. Owing to this layout limitation, in a system constituted by a portable computer and a docking station, the HC is difficult to integrate in the docking station.

BRIEF SUMMARY OF THE INVENTION

It is an object of the present invention to provide a computer system capable of reliably realizing the USB legacy support function with a simple hardware configuration having a higher degree of freedom without any influence on the normal communication processing speed with a keyboard controller directly independent of the USB, and a USB device control method.

According to the present invention, there is provided a computer system comprising a keyboard controller for controlling a keyboard or mouse, the keyboard controller having a first I/O port used as an input/output buffer for communication between the keyboard or mouse and a keyboard (mouse) control program, and in response to reception of data from the keyboard or mouse, outputting the data to an output buffer of the first I/O port, a USB host controller for controlling a keyboard or mouse corresponding to a USB, and data emulation means for transforming packet data from the USB keyboard or mouse which is received by the USB host controller into data interpretable by the keyboard (mouse) control program, and transferring the data to the output buffer of the first I/O port.

In the computer system, no "Emulate" register is arranged in the USB host controller. The I/O port of the keyboard controller is used for both communication between the keyboard (mouse) control program of the BIOS/OS/application and the PS/2 keyboard or mouse connected to the keyboard controller, and communication between the keyboard (mouse) control program and the USB keyboard or mouse.

For this reason, communication with the PS/2 keyboard or mouse independent of the USB is performed by reading/writing data in/from the I/O port of the keyboard controller directly by the keyboard control program of the BIOS/OS/application, similar to the normal system configuration having no USB legacy support. That is, when data is received from the PS/2 keyboard or mouse connected to the keyboard controller, the data is set in the I/O port. The keyboard controller generates IRQ1 (IRQ12) to start the keyboard (mouse) control program of the BIOS/OS/application. The keyboard (mouse) control program reads the key data (mouse data) from the I/O port.

On the other hand, when the USB host controller receives packet data from the USB keyboard or mouse, the data emulation means is started. This data emulation means transforms the packet data into data corresponding to the PS/2 keyboard or mouse, and then transfers it to the I/O port of the keyboard controller. Upon reception of the data, the keyboard controller generates IRQ1 (IRQ12) similar to the case wherein it receives data from the PS/2 keyboard or mouse, thereby starting the keyboard (mouse) control program of the BIOS/OS/application. In this manner, by arranging the mechanism of transferring transformed data to the I/O port of the keyboard controller, the USB legacy support using the I/O port of the keyboard controller can be implemented.

In an OS environment having no USB device support, the USB keyboard or mouse can be used as a PS/2 keyboard or mouse without any influence on a normal communication process between the PS/2 keyboard or mouse and the keyboard (mouse) control program. Since the USB host controller need not trap an interrupt signal from the keyboard controller, a free layout such as an arrangement in which the USB host controller is built in the docking station can be implemented.

The data emulation means can utilize an emulation program started by an interrupt signal such as an SMI. In this case, it is preferable for the emulation program not to directly write the transformed packet data in the output buffer of the I/O port of the keyboard controller but to temporarily write it in another I/O port of the keyboard controller and cause the keyboard controller to internally transfer it to the output buffer. Consequently, an inconvenience caused by, e.g., unexpected changes in output buffer can be prevented.

A configuration in which the USB host controller and the keyboard controller are connected via a dedicated serial bus can be employed. In this case, the data emulation means can be implemented by not software but a hardware logic or a microcomputer firmware arranged in the USB host controller or the keyboard controller.

By providing a keyboard controller incorporating the USB host controller, the USB host controller and the keyboard controller can be implemented by one chip. In this case, a serial bus connecting the USB host controller and the keyboard controller can be eliminated to realize a simpler configuration.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described below with reference to the several views of the accompanying drawing.

Figure 1:
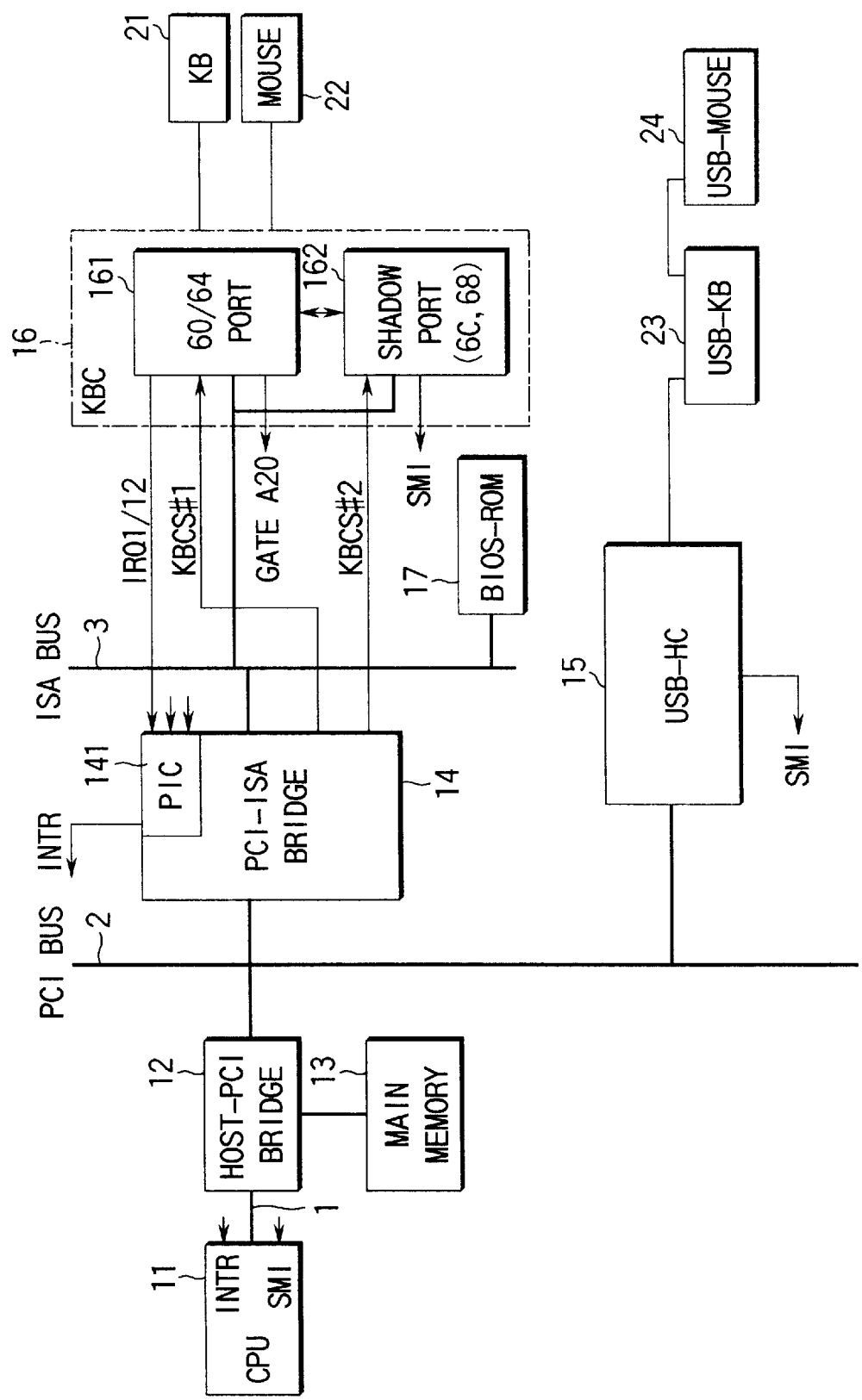
FIG. 1 is a block diagram showing the configuration of a computer system according to the first embodiment of the present invention.

FIG. 1 shows the configuration of a computer system according to the first embodiment of the present invention. As shown in FIG. 1, three types of buses, i.e., a host bus 1, a PCI bus 2, and an ISA bus 3 are disposed on the system board of this computer system. A CPU 11, a host-PCI bridge 12, a main memory 13, a PCI-ISA bridge 14, a USB host controller (USB-HC) 15, a keyboard controller (16), a BIOS-ROM 17, and the like are arranged on the system board.

The CPU 11 executes control of the whole operation of this system and a data process. As the CPU 11, one which supports a system management interrupt SMI, e.g., a microprocessor "pentium" available from Intel Corp., USA is used. The SMI is one kind of non-maskable interrupt NMI, which has higher priority than that of a normal NMI or maskable interrupt INTR, i.e., the highest priority.

The main memory 13 is a memory device storing an operating system, device drivers, an application program to be executed, processing data, and the like, and is constituted by a plurality of DRAMs and the like. The main memory 13 is connected to the host-PCI bridge 12 via a dedicated memory bus having 32- or 64-bit data width. As the data bus of the memory bus, the data bus of the host bus 1 can also be used. In this case, the memory bus is constituted by an address bus and various memory control signal lines.

The host-PCI bridge 12 is a bridge LSI connecting the host bus 1 and the PCI bus 2, and functions as one of bus masters of the PCI bus 2. The host-PCI bridge 12 has a function of bidirectionally transforming a bus cycle including data and an address between the host bus 1 and the PCI bus 2, a function of controlling access to the main memory 13 via the memory bus, and the like.

The PCI-ISA bridge 14 is a bridge LSI connecting the PCI bus 2 and the ISA bus 3. The BIOS-ROM 17, the keyboard controller 16, and the like are connected to the ISA bus 3. The PCI-ISA bridge 14 incorporates an interrupt controller (PIC) 141. The interrupt controller (PIC) 141 issues interrupt signals (INTR) in response to hardware interrupt request signals IRQ from respective I/O devices on the ISA bus 3.

The keyboard controller 16 controls a PS/2 keyboard 21 and a PS/2 mouse 22, and has a standard bus interface used in a PC/AT compatible. An I/O port register (60h/64h port) 161, a function of generating IRQ1 and IRQ12, a gate A20 sequence function, and the like are set on this standard bus interface.

The I/O port (60h/64h port) 161 is used as a data input/output buffer for transmitting/receiving key data (mouse data) and a command. In I/O read, the I/O port (60h) is used to read key data (mouse data), and I/O port (64h) is used to read status data. In I/O write, the I/O port (60h) and the I/O port (64h) are respectively used to write a KBC command and its parameter. Both a command to a scan controller arranged in the keyboard controller 16 or the PS/2 keyboard 21, and its parameter are written in the I/O port (60h).

The keyboard controller 16 has, as the 2nd bus interface, a shadow port register 162, an SMI generation function, and a function of switching validity/invalidity of the USB legacy support function.

An I/O address (6 Ch, 68h) is assigned to the shadow port register 162. The shadow port register 162 is an extra register prepared in the keyboard controller 16, and is not usually used in a PC/AT compatible.

The I/O port (60h/64h port) 161 of the standard bus interface becomes accessible when a KBC chip select signal KBCS#1 is asserted. The shadow port (6 Ch/68h) 162 becomes accessible when a KBC chip select signal KBCS#2 is asserted. Which of KBCS#1 or KBCS#2 is asserted is determined by the results of address decoding by the PCI-ISA bridge 14. That is, KBCS#1 is asserted when an I/O cycle for the I/O address (60h/64h) is executed by the CPU 11, whereas KBCS#2 is asserted when an I/O cycle for the I/O address (6 Ch/68h) is executed by the CPU 11.

The shadow port (6 Ch/68 h) 162 and the I/O port (60h/64h) 161 are coupled to each other within the keyboard controller 16, and can mutually transfer data. This data transfer is controlled by an MPU incorporated in the keyboard controller 16.

In this embodiment, the shadow port 162 is used for data write and command read by a USB legacy support SM-BIOS. Data written in the shadow port 162 by the SM-BIOS is transferred as keyboard/mouse data to the I/O port (60h/64h) 161 of the standard bus interface.

A 2nd bus interface SMI is used to transfer a command written in the I/O port (60h/64h port) 161 to the SM-BIOS via the shadow port 162.

The USB host controller 15 controls USB devices such as a USB keyboard 23 and a USB mouse 24, and is implemented as a PCI device. If the USB keyboard 23 has a hub function, the USB mouse 24 can be connected to the USB keyboard 23, as shown in FIG. 1. For the USB legacy support, the USB host controller 15 has a function of generating an SMI upon reception of a USB packet, and a register of switching validity/invalidity of the USB legacy support.

When the USB legacy support is invalid, no SMI is generated from the USB host controller 15 upon reception of a USB packet. Instead, a normal PCI device interrupt signal is generated from the USB host controller 15. The USB legacy support function of the KBC 16 also becomes invalid, and the SMI generation function is stopped upon reception of a command.

The validity/invalidity of the USB legacy support is switched by rewriting the switch register of the USB host controller 15 by a USB driver. That is, in an environment wherein no USB driver is installed, the USB legacy support is set to be valid. If the USB driver is installed, the USB driver rewrites the switch register to invalidate the USB legacy support. The validity/invalidity of the USB legacy support of the KBC 16 is switched by the SM-BIOS started in response to rewrite of the switch register by the USB driver.

The BIOS-ROM 17 stores various BIOS drivers for controlling hardware, the above-described USB legacy support SM-BIOS, and the like. This SM-BIOS is started by an SMI from the USB host controller 15 and an SMI from the KBC 16.

Figure 2:
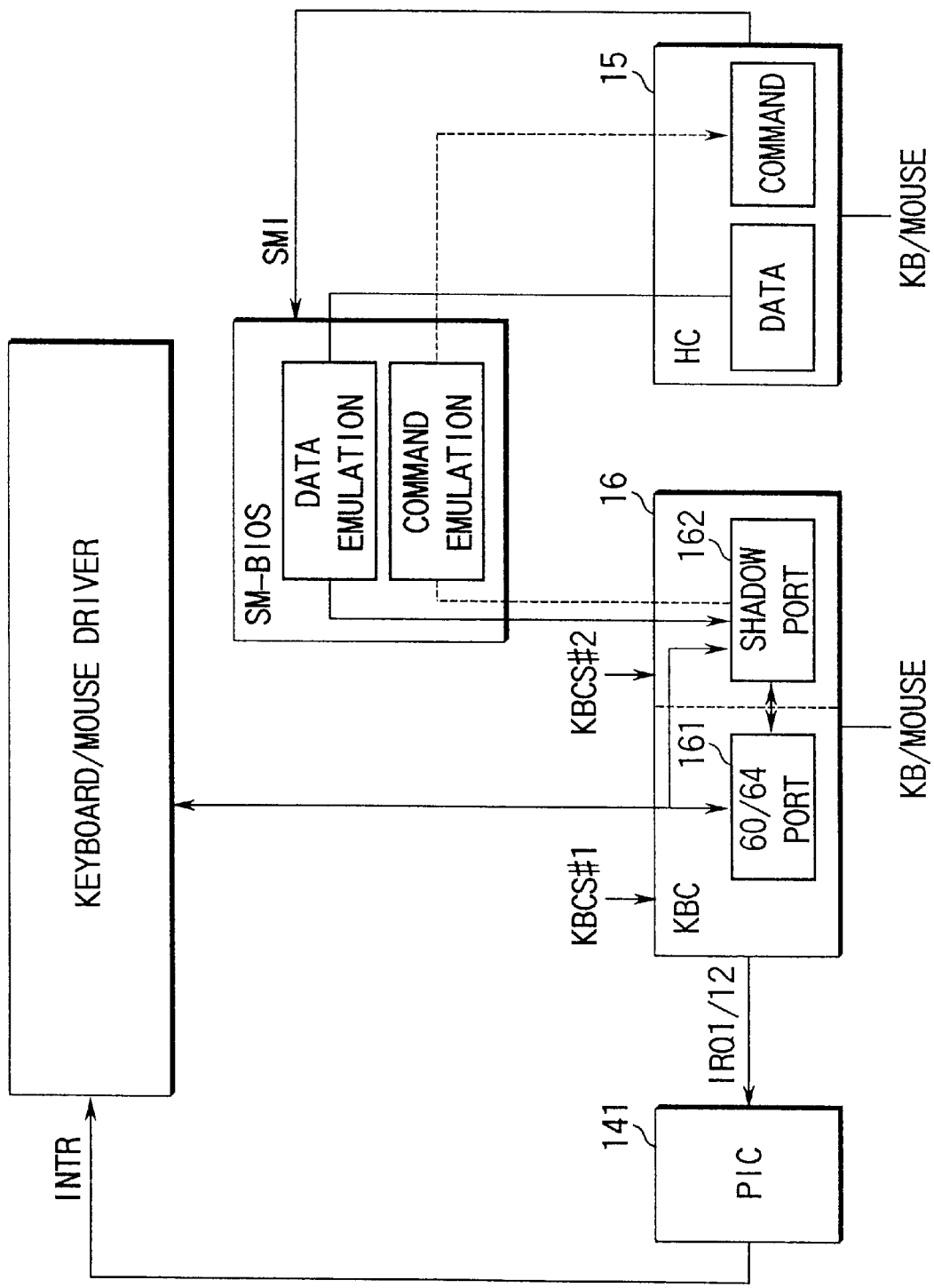
FIG. 2 is a view for explaining the principle of a USB legacy support method applied to the computer system of the first embodiment.

FIG. 2 is a model view showing the relationship between software and hardware used in this embodiment. An operation performed when the USB legacy support is valid will be explained below with reference to this model view.

1. Reception of Data from PS/2 Keyboard/Mouse

In this embodiment, the I/O port 161 of the KBC 16 is used for both data reception from the PS/2 keyboard/mouse and data reception from the USB keyboard/mouse. Therefore, an operation upon reception of data from the PS/2 keyboard/mouse is completely the same as that in a normal system configuration having no USB legacy support, and performed by reading the I/O port (60h/64h port) 161 of the KBC 16 directly by the keyboard (mouse) control program (to be referred to as a keyboard (mouse) driver hereinafter) of the BIOS/OS/application.

More specifically, when data is received from the PS/2 keyboard 21 or the PS/2 mouse 22 connected to the KBC 16, it is set in the I/O port (60h/64h) 161. Then, the KBC 16 generates IRQ1 (IRQ12). IRQ1 (IRQ12) is input as INTR to the CPU 11 via the interrupt controller (PIC) 141, thereby starting the keyboard (mouse) driver. The keyboard (mouse) driver reads key data (mouse data) from the I/O port (60h/64h) 161, and transfers it to the BIOS/OS/application waiting for a key input.

Figure 3:
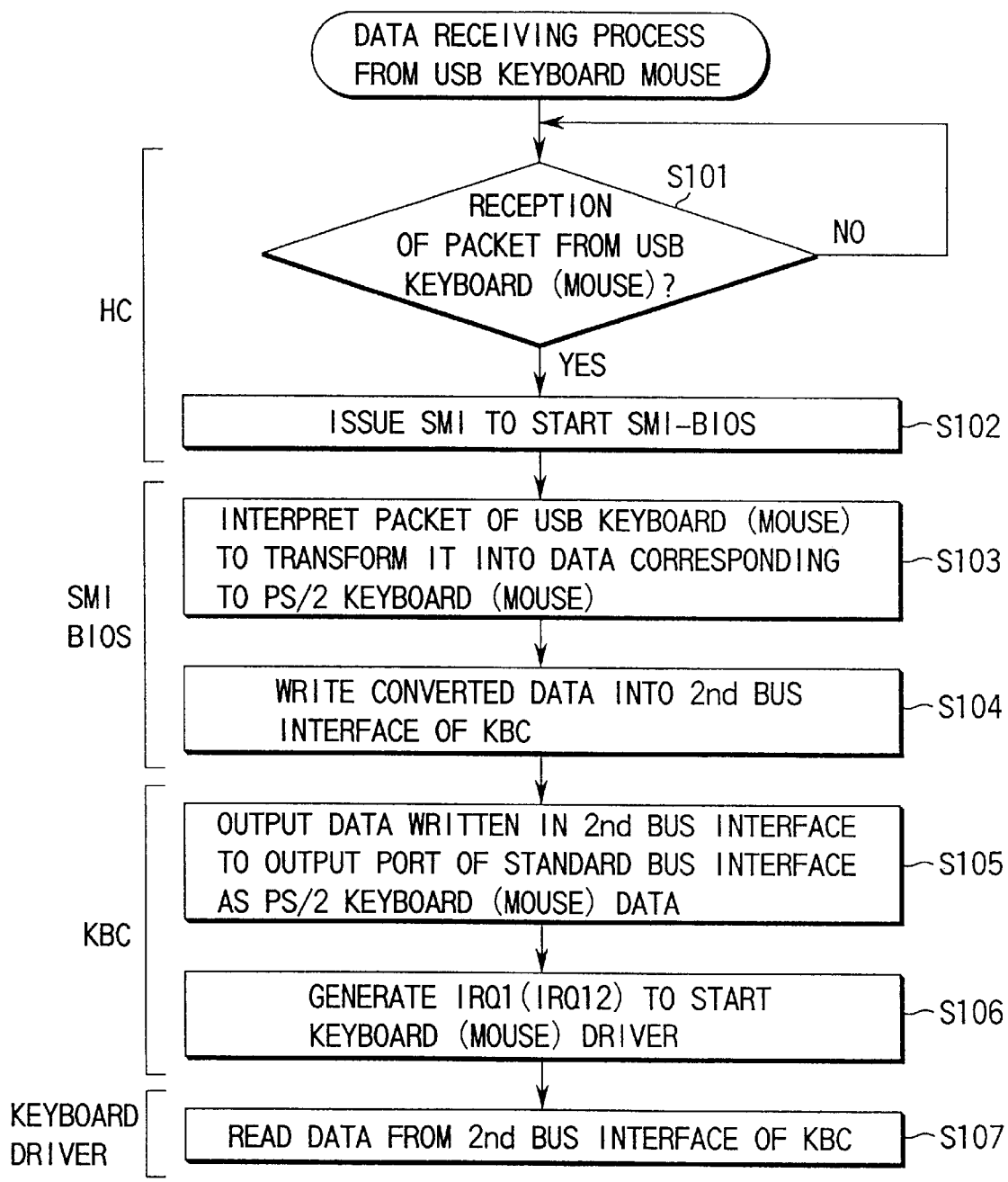
FIG. 3 is a flow chart showing the procedure of a data receiving process from a USB keyboard/mouse in the computer system of the first embodiment.

2. Reception of Data from USB Keyboard/Mouse (See Flow Chart in FIG. 3)

(1) Upon reception of a packet from the USB keyboard (mouse) (step S101), the USB host controller 15 issues an SMI (step S102). This SMI starts the SM-BIOS.

(2) The SM-BIOS reads and interprets the packet of the USB keyboard (mouse) from the USB host controller 15 to transform it into data corresponding to the PS/2 keyboard (mouse) (step S103). The SM-BIOS writes the transformed data in the shadow port 162 of the 2nd bus interface of the KBC 16 (step S104).

(3) The KBC 16 transfers the data written in the shadow port 162 of the 2nd bus interface as PS/2 keyboard (mouse) data to the output buffer of the I/O port 161 of the standard bus interface, and generates IRQ1 (IRQ12) (steps S105 and S106). Upon generation of IRQ1 (IRQ12), the keyboard (mouse) driver starts.

(4) The keyboard (mouse) driver reads the keyboard (mouse) data from the I/O port 161 of the standard bus interface of the KBC 16 (step S107).

Figure 4:
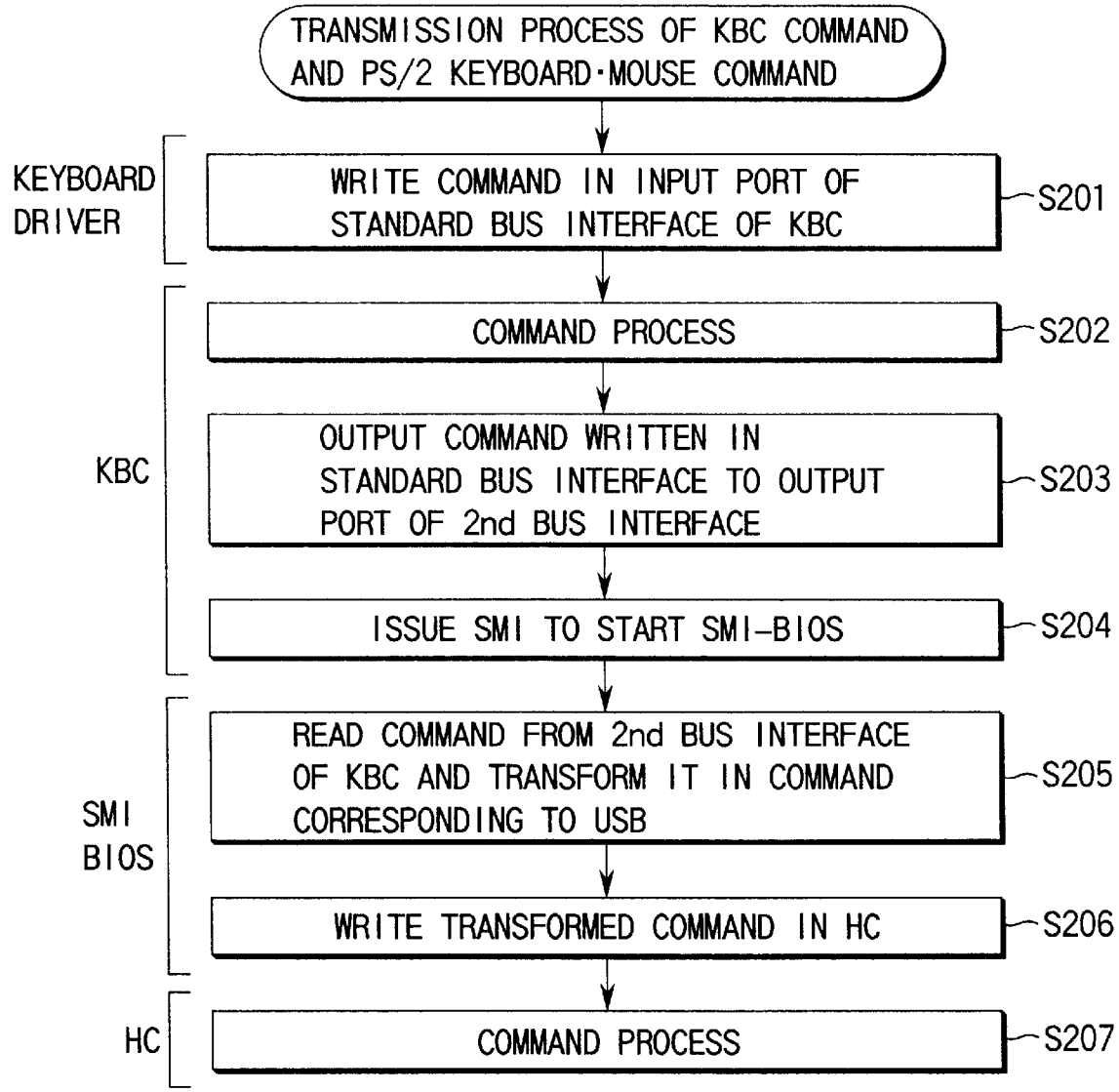
FIG. 4 is a flow chart showing the procedure of a command transmission process in the computer system of the first embodiment.

3. Transmission of Command (KBC Command, PS/2 Keyboard/Mouse Command) to KBC (See FIG. 4)

(1) The BIOS/OS/application writes a command in the I/O port 161 of the standard bus interface of the KBC 16 directly or via the keyboard (mouse) driver (step S201).

(2) The KBC 16 performs the command process (step S202). In the case of a PS/2 keyboard/mouse command, the KBC 16 transmits data to the PS/2 keyboard (mouse). At the same time, the KBC 16 transfers the command to the shadow port 162 of the 2nd bus interface (step S203), and generates an SMI (step S204).

(3) The SM-BIOS reads the transmitted data from the shadow port 162 of the 2nd bus interface of the KBC, transforms it into a command packet corresponding to the USB keyboard (mouse), as needed (step S205), and writes it in the register of the USB host controller 15 (step S206). As a result, a communication from the USB host controller 15 starts. The command is transmitted to the USB keyboard (mouse) (step S207).

As described above, in the first embodiment, USB packet data transformed by the SM-BIOS into data corresponding to the PS/2 keyboard/mouse is transferred to the I/O port (60h/64h) via the shadow port 162 of the KBC 16. In response to the data, the KBC 16 generates IRQ1 (IRQ12) similar to the case wherein it receives data from the PS/2 keyboard or mouse, thereby starting the keyboard (mouse) driver. In this manner, by arranging the mechanism of transferring transformed data to the I/O port 161 of the KBC 16, the I/O port 161 of the keyboard controller can be used for both communication between the keyboard (mouse) driver of the BIOS/OS/application and the PS/2 keyboard or mouse connected to the keyboard controller 16, and communication between the keyboard (mouse) driver and the USB keyboard or mouse.

Communication with the PS/2 keyboard or mouse independent of the USB is performed by reading/writing data in/from the I/O port 161 of the keyboard controller 16 directly by the keyboard (mouse) driver, similar to the normal system configuration having no USB legacy support. Therefore, in an OS environment having no USB device support, the USB keyboard or mouse can be used as a PS/2 keyboard or mouse without any influence on a normal communication process between the PS/2 keyboard or mouse and a keyboard (mouse) control program.

Since the interrupt signal IRQ1 (IRQ12) from the KBC 16 need not be trapped by the USB host controller 15, a free layout can be implemented. In a system constituted by a portable computer and a docking station, the USB host controller 15 can be built in the docking station.

Figure 5:
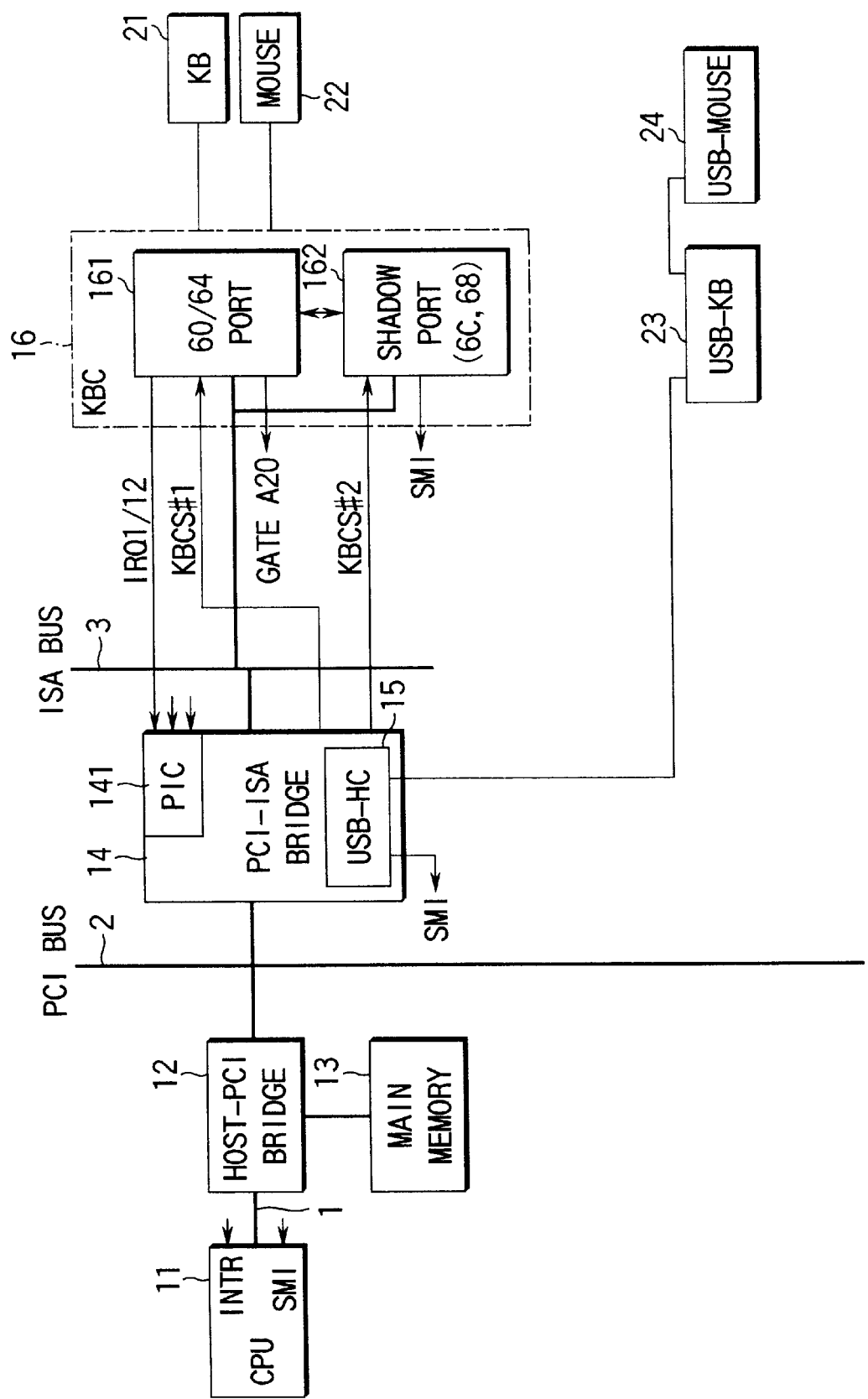
FIG. 5 is a block diagram showing another example of the configuration of the computer system according to the first embodiment.

Note that the USB host controller 15 may be incorporated as one I/O controller in the PCI-ISA bridge 14, as shown in FIG. 5.

The second embodiment of the present invention will be described below.

Figure 6:
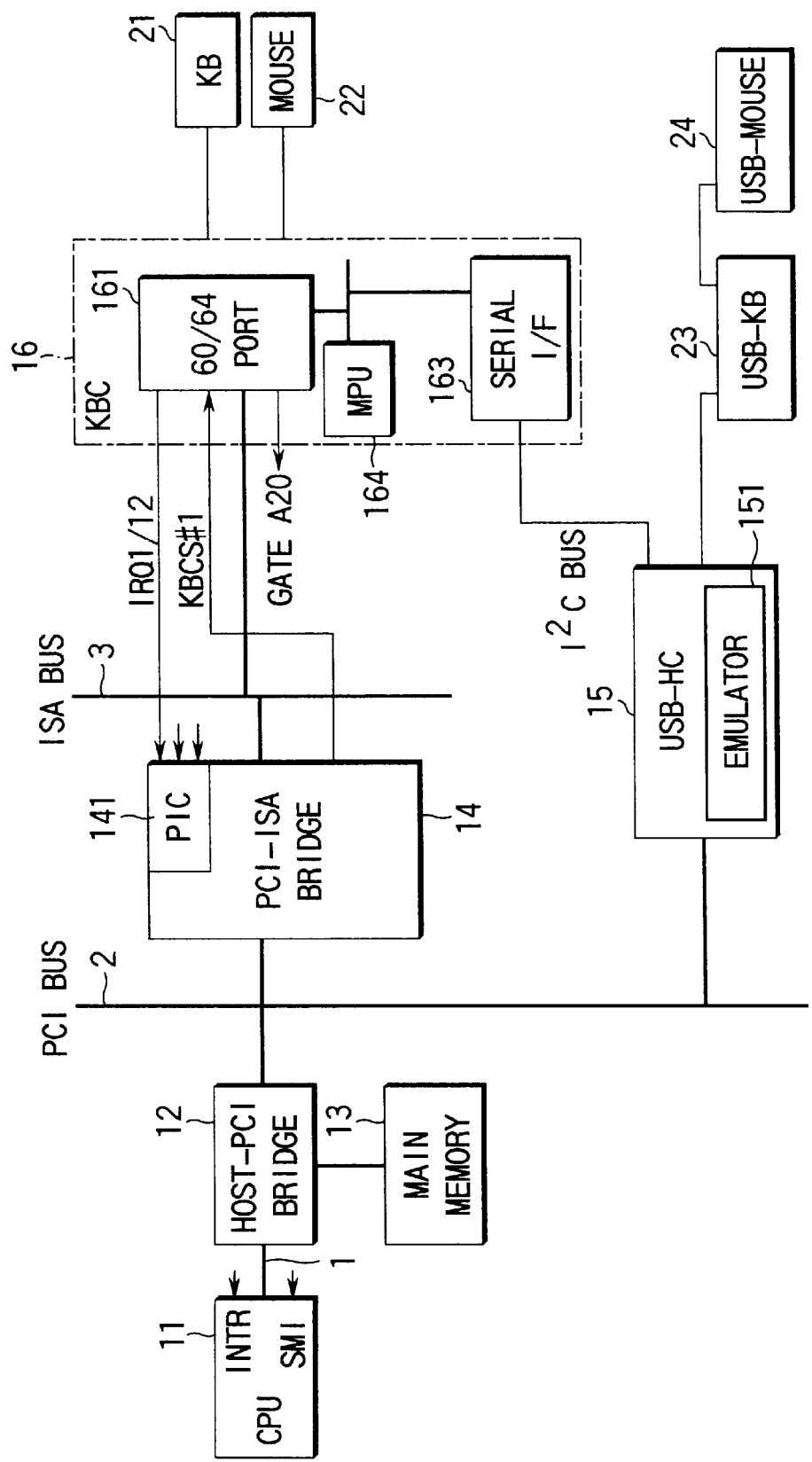
FIG. 6 is a block diagram showing the configuration of a computer system according to the second embodiment of the present invention.

FIG. 6 shows the configuration of a computer system according to the second embodiment of the present invention.

In the second embodiment, a USB host controller 15 and a keyboard controller 16 are connected via an I$^2$C bus, and transformation of data and a command is executed by not the SM-BIOS but an emulator 151 serving as the hardware logic of the USB host controller 15, or an MPU 164 of the keyboard controller 16.

An operation performed when the USB legacy support is valid will be explained below.

A case wherein data and a command are transformed using the emulator 151 of the USB host controller 15 will be first explained.

1. Reception of Data from PS/2 Keyboard/Mouse

The operation is the same as that in the first embodiment.

Figure 7:
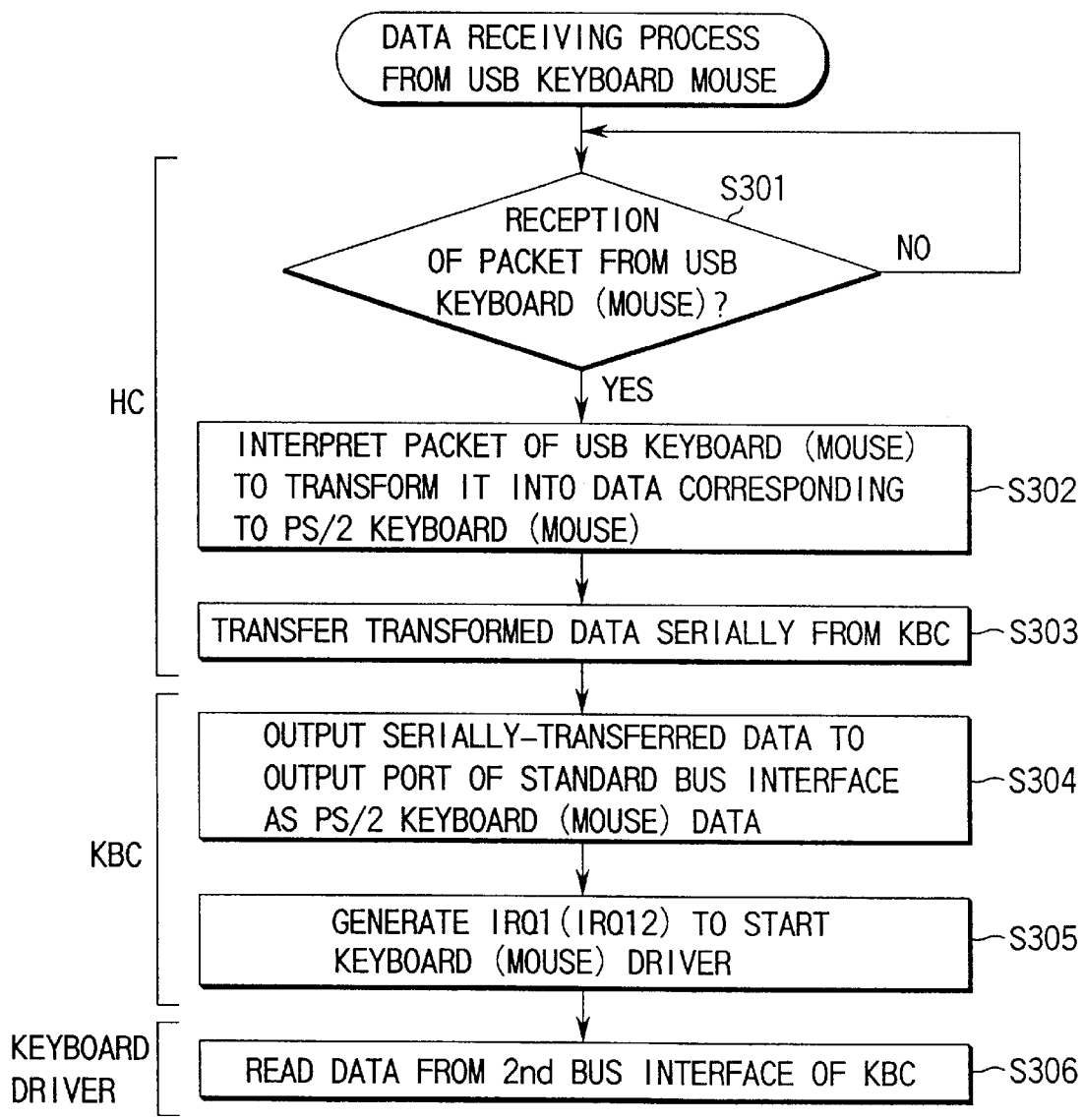
FIG. 7 is a flow chart showing the procedure of a data receiving process from the USB keyboard/mouse in the computer system of the second embodiment.

2. Reception of Data from USB Keyboard/Mouse (See Flow Chart in FIG. 7)

(1) Upon reception of a packet transfer request from the USB keyboard (mouse) (step S301), the USB host controller 15 uses the emulator 151 to interpret it, and transforms it into data corresponding to the PS/2 keyboard (mouse) (step S302).

(2) The USB host controller 15 serially transfers the transformed data to a serial interface 163 of the KBC 16 via the I$^2$C bus (step S303).

(3) The MPU 164 of the KBC 16 transfers the serially transferred data as PS/2 keyboard (mouse) data to the output buffer of an I/O port 161 of the standard bus interface, and generates IRQ1 (IRQ12) (steps S304 and S305). Upon generation of IRQ1 (IRQ12), the keyboard (mouse) driver starts.

(4) The keyboard (mouse) driver reads keyboard (mouse) data from the I/O port 161 of the standard bus interface of the KBC 16 (step S306).

Figure 8:
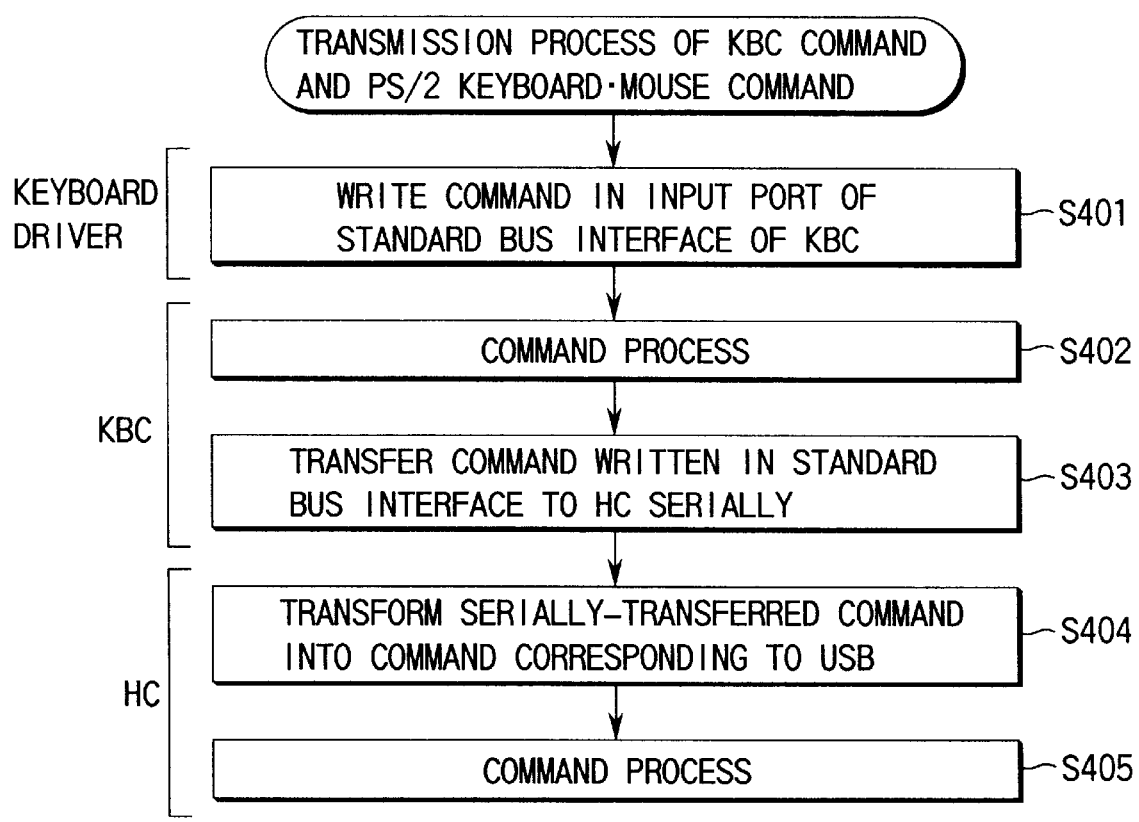
FIG. 8 is a flow chart showing the procedure of a command transmission process in the computer system of the second embodiment.

3. Transmission of Command (KBC Command, PS/2 Keyboard/Mouse Command) to KBC (See FIG. 8)

(1) The BIOS/OS/application writes a command in the I/O port 161 of the standard bus interface of the KBC 16 directly or via the keyboard (mouse) driver (step S401).

(2) The KBC 16 performs the command process (step S402). In the case of a PS/2 keyboard/mouse command, the KBC 16 transmits data to the PS/2 keyboard (mouse). At the same time, the KBC 16 serially transfers the command to the USB host controller 15 via the I²C bus (step S403).

(3) The emulator 151 of the USB host controller 15 transforms the command into a command packet corresponding to the USB keyboard (mouse), as needed, and performs the command process. If needed, the emulator 151 transmits the command packet to the USB keyboard (mouse) via the USB host controller 15 (steps S404 and S405).

A case wherein data and a command are transformed using the MPU 164 of the KBC 16 will be explained below.

1. Reception of Data from PS/2 Keyboard/Mouse

The operation is the same as that in the first embodiment.

Figure 9:
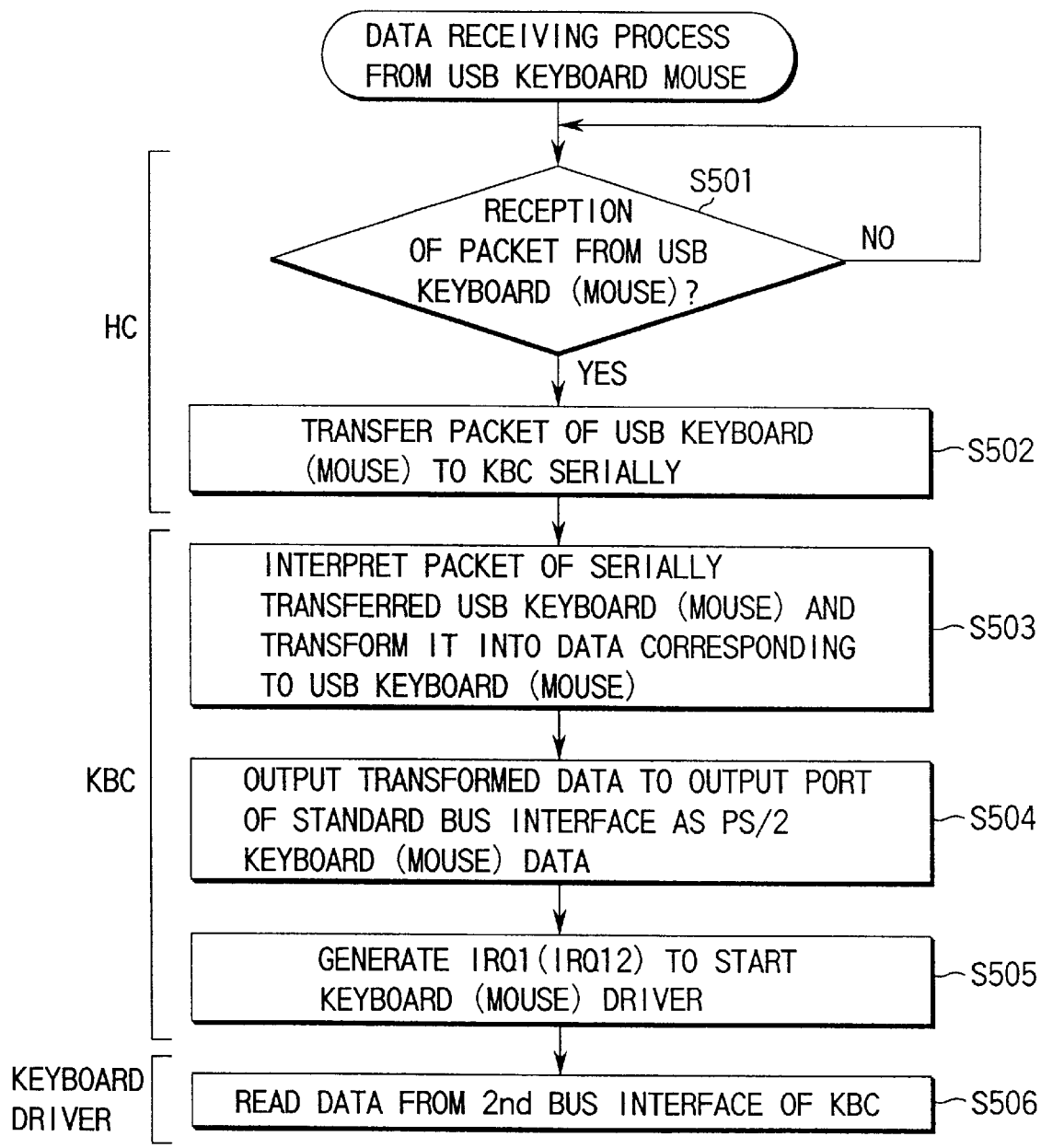
FIG. 9 is a flow chart showing another procedure of the data receiving process from the USB keyboard/mouse in the computer system of the second embodiment.

2. Reception of Data from USB Keyboard/Mouse (See Flow Chart in FIG. 9)

(1) Upon reception of a packet transfer request from the USB keyboard (mouse) (step S501), the USB host controller 15 serially transfers it to the serial interface 163 of the KBC 16 via the I²C bus (step S502).

(2) The MPU 164 of the KBC 16 interprets the serially transferred data, and transforms it into data corresponding to the PS/2 keyboard (mouse) (step S503).

(3) The MPU 164 of the KBC 16 transfers the transformed data as PS/2 keyboard (mouse) data to the output buffer of the I/O port 161 of the standard bus interface, and generates IRQ1 (IRQ12) (steps S504 and S505). Upon generation of IRQ1 (IRQ12), the keyboard (mouse) driver starts.

(4) The keyboard (mouse) driver reads keyboard (mouse) data from the I/O port 161 of the standard bus interface of the KBC 16 (step S506).

Figure 10:
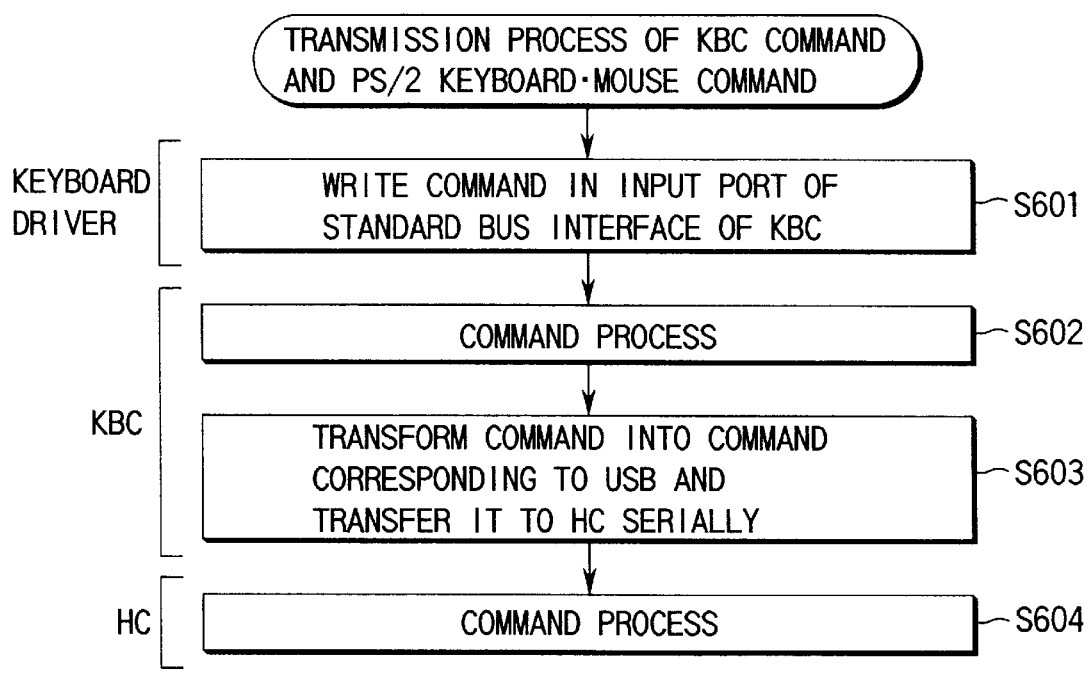
FIG. 10 is a flow chart showing another procedure of the command transmission process in the computer system of the second embodiment.

3. Transmission of Command (KBC Command, PS/2 Keyboard/Mouse Command) to KBC (See FIG. 10)

(1) The BIOS/OS/application writes a command in the I/O port 161 of the standard bus interface of the KBC 16 directly or via the keyboard (mouse) driver (step S601).

(2) The MPU 164 of the KBC 16 performs the command process (step S602). In the case of a PS/2 keyboard/mouse command, the MPU 164 transmits data to the PS/2 keyboard (mouse). At the same time, the MPU 164 transforms the command into a command packet corresponding to the USB keyboard (mouse), and serially transfers it to the USB host controller 15 via the I²C bus (step S603).

(3) The USB host controller 15 performs the command process. If needed, the command packet is transmitted to the USB keyboard (mouse) via the USB host controller 15 (step S604).

As described above, in the second embodiment, the USB host controller 15 and the KBC 16 have the functions of performing communication therebetween. Transformation of data and a command is executed by the USB host controller 15 or the KBC 16. Therefore, the USB legacy support can be implemented without starting the SM-BIOS.

Figure 11:
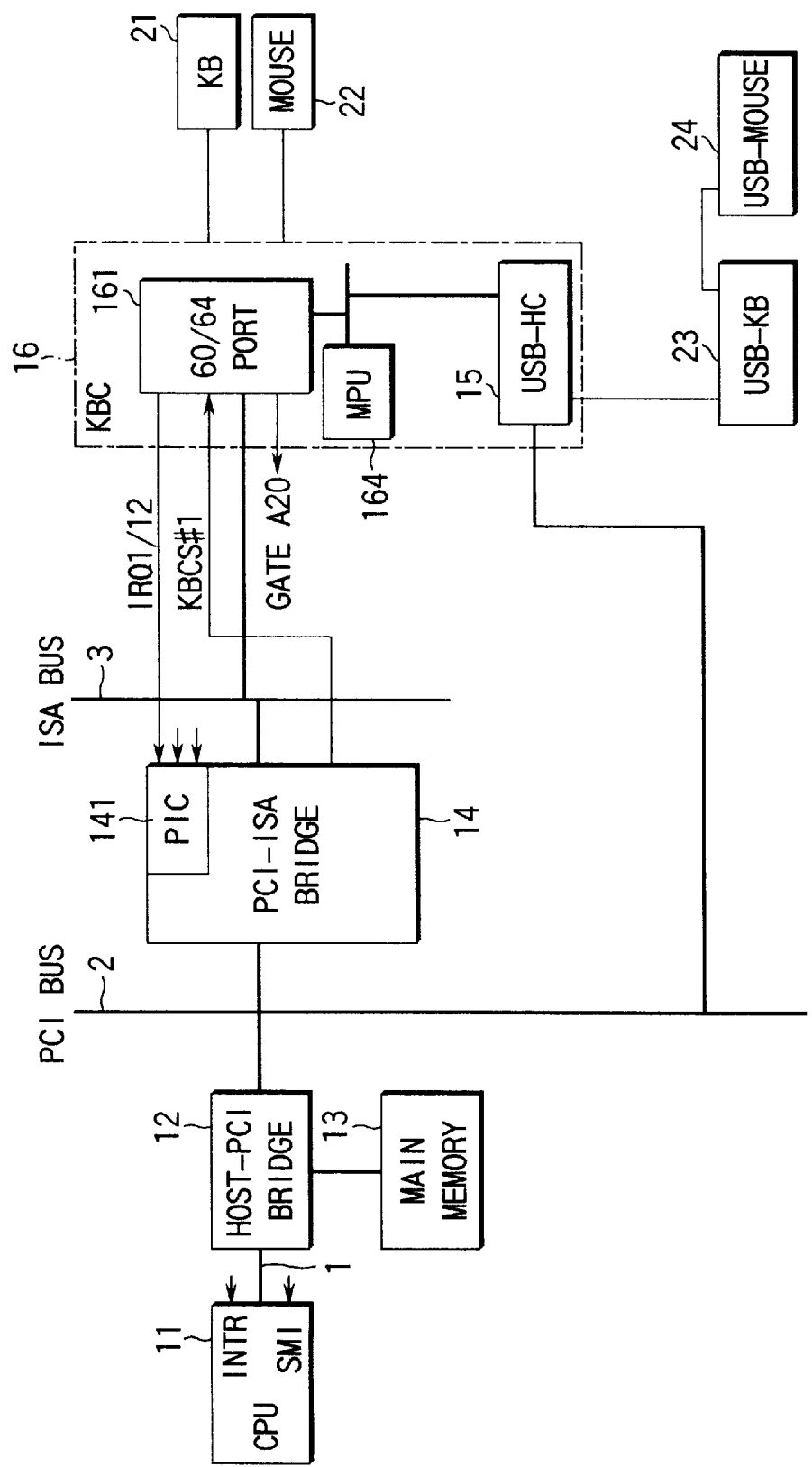
FIG. 11 is a block diagram showing the configuration of a computer system according to the third embodiment of the present invention.

FIG. 11 shows the configuration of a computer system according to the third embodiment of the present invention.

In the third embodiment, a USB host controller 15 and a keyboard controller 16 are implemented by one chip by incorporating the USB host controller 15 in the keyboard controller 16.

Since the USB host controller 15 is a PCI device, the keyboard controller 16 comprises a PCI bus interface connected to a PCI bus 2, in addition to the above-described standard bus interface connected to an ISA bus 3. Transformation of data and a command is executed by the USB host controller 15 or the KBC 16 without using any SM-BIOS, similar to the second embodiment.

Compared to the second embodiment, the third embodiment does not require any I²C bus to attain a simple hardware configuration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A computer system comprising:
    a Peripheral Component Interconnect (PCI) bus;
    an Industry Standard Architecture (ISA) bus;
    a bus bridge connecting said PCI bus and said ISA bus;
    a keyboard controller, coupled to said ISA bus, including a first I/O port buffer used for storing data corresponding to a PS/2-compliant I/O device, and for generating an IRQ interrupt to initiate a driver to read the data in said first I/O port buffer, wherein said keyboard controller further includes a second I/O port buffer;
    a Universal Serial Bus (USB) host controller, coupled to said PCI bus, for controlling a USB I/O device, wherein said USB host controller issues a system management interrupt in response to reception of data from the USB I/O device; and
    System Management Interrupt (SMI) BIOS means, responsive to the system management interrupt from said USB host controller, for transforming the data from said USB host controller into data corresponding to the PS/2-compliant I/O device and writing the transformed data in said second I/O port buffer, wherein said keyboard controller transfers the data written in said second I/O port buffer to said first I/O port buffer and issues the IRQ interrupt for causing the driver to read the data in said first I/O port buffer.

2. The system according to claim 1, wherein said USB host controller is incorporated in said bus bridge.

3. The system according to claim 1, wherein said USB I/O device is one of a USB keyboard or a USB mouse.

4. The system according to claim 1, wherein said driver includes means for writing a command to said first I/O port buffer so as to cause said keyboard controller to process the written command.

5. The system according to claim 4, wherein the command processed by said keyboard controller is transferred to at least one of the PS/2 compliant I/O device or USB I/O device.

6. The system according to claim 4, wherein said keyboard controller includes means for transferring the command written in said first I/O port buffer to said second I/O port buffer.

7. The system according to claim 6, wherein said SMI-BIOS means further includes means for transforming the command in said second I/O port buffer into a command corresponding to the USB I/O device to transfer the transformed command to said USB host controller.

8. A computer system comprising:

a Peripheral Component Interconnect (PCI) bus;

an Industry Standard Architecture (ISA) bus;

a bus bridge connecting said PCI bus and said ISA bus;

a keyboard controller, coupled to said ISA bus, including an I/O port buffer used for storing data corresponding to a PS/2-compliant I/O device, and for issuing an IRQ interrupt for causing a driver to read the data in said I/O port buffer; and a USB (Universal Serial Bus) host controller, coupled to said PCI bus, to control a USB I/O device, wherein said USB host controller includes means for transforming data received from the USB I/O device into data corresponding to a PS/2-compliant I/O device, to serially transfer to said keyboard controller via a serial bus, wherein said keyboard controller includes a processor for transferring the data serially transferred from said USB host controller via the serial bus to said I/O port buffer, and to issue the IRQ interrupt for causing the driver to read the data in said I/O port buffer.

9. The system according to claim 8, wherein said USB I/O device is one of a USB keyboard or a USB mouse.

10. The system according to claim 8, wherein said driver includes means for writing a command to said I/O port buffer so as to cause said keyboard controller to process the written command.

11. The system according to claim 8, wherein the command processed by said keyboard controller is transferred to at least one of the PS/2-compliant I/O device or USB I/O device.

12. The system according to claim 8, wherein the command written in said I/O port buffer is transferred to said USB host controller via the serial bus to control the USB I/O device.

13. The system according to claim 12, wherein said processor includes means for transforming the command written in said I/O port buffer into a command compliant with the USB I/O device.

14. The system according to claim 12, wherein said USB host controller includes means for transforming the command written in said I/O port buffer into a command corresponding to the USB I/O device.

15. A computer system comprising:

a Peripheral Component Interconnect (PCI) bus;

an Industry Standard Architecture (ISA) bus;

a bus bridge connecting said PCI bus and said ISA bus;

a one-chip keyboard controller, coupled to said ISA bus, including an I/O port buffer used for storing data corresponding to a PS/2-compliant I/O device, and for issuing an IRQ interrupt for causing a driver to read the data in said I/O port buffer; and a Universal Serial Bus (USB) host controller, coupled to said PCI bus and incorporated in said one-chip keyboard controller, for controlling a USB I/O device, wherein said USB host controller includes means for transforming data received from the USB I/O device into data corresponding to a PS/2-compliant I/O device, wherein said one-chip keyboard controller includes a processor for transferring the transformed data to said I/O port buffer and issues the IRQ interrupt for causing the driver to read the data in said I/O port buffer.

16. The system according to claim 15, wherein said USB I/O device is one of a USB keyboard or a USB mouse.

17. The system according to claim 15, wherein said driver includes means for writing a command to said I/O port buffer so as to cause said keyboard controller to process the written command.

18. The system according to claim 15, wherein the command processed by said keyboard controller is transferred to at least one of the PS/2-compliant I/O device or USB I/O device.

19. The system according to claim 18, wherein said processor includes means for transforming the command written in said I/O port buffer into a command corresponding to the USB I/O device.

20. The system according to claim 18, wherein said USB host controller includes means for transforming the command written in said I/O port buffer into a command corresponding to the USB I/O device.

* * * * *